United States Patent [19]

Hirano

[11] 4,094,784
[45] June 13, 1978

[54] APPARATUS AND METHOD FOR FILTERING DEHYDRATING AND DRYING MATERIAL

[75] Inventor: Itsuro Hirano, Tokyo, Japan

[73] Assignee: B F Kogyo Kaisha, Ltd. (Bi Efy Kogyo Kabushiki Kaisha), Tokyo, Japan

[21] Appl. No.: 709,018

[22] Filed: Jul. 27, 1976

[30] Foreign Application Priority Data

Dec. 30, 1975 Japan .................................. 50-158696

[51] Int. Cl.² ...................... B01D 37/00; B01D 35/20
[52] U.S. Cl. ......................................... 210/68; 210/77; 210/384; 210/390
[58] Field of Search ................ 210/77, 384, 385, 388, 210/390, 398, 406, 407, 328, 359, 68; 209/352

[56] References Cited

U.S. PATENT DOCUMENTS 1,858,160  5/1932  Leek ..................................... 210/328
1,861,537  6/1932  Leek ..................................... 210/328

*Primary Examiner*—William A. Cuchlinski, Jr.
*Attorney, Agent, or Firm*—Blum, Moscovitz, Friedman & Kaplan

[57] ABSTRACT

A filter apparatus for treating material comprises a filter cylinder, a hollow valve plate mounted rotatably in the center portion of the filter cylinder and having a filter mesh provided thereon, and a hollow shaft connected to the valve plate to cause the valve plate to rotate and discharging a filtrate therethrough. The filter apparatus is preferably provided with a vibrator to cause the filter mesh to be vibrated and an auxiliary filter equipment to improve filtering efficiency. The material is filtered, dehydrated and dried on the filter mesh in one process, and then is dropped from the filter mesh by rotating the filter mesh, thus the treated material is obtained.

29 Claims, 10 Drawing Figures

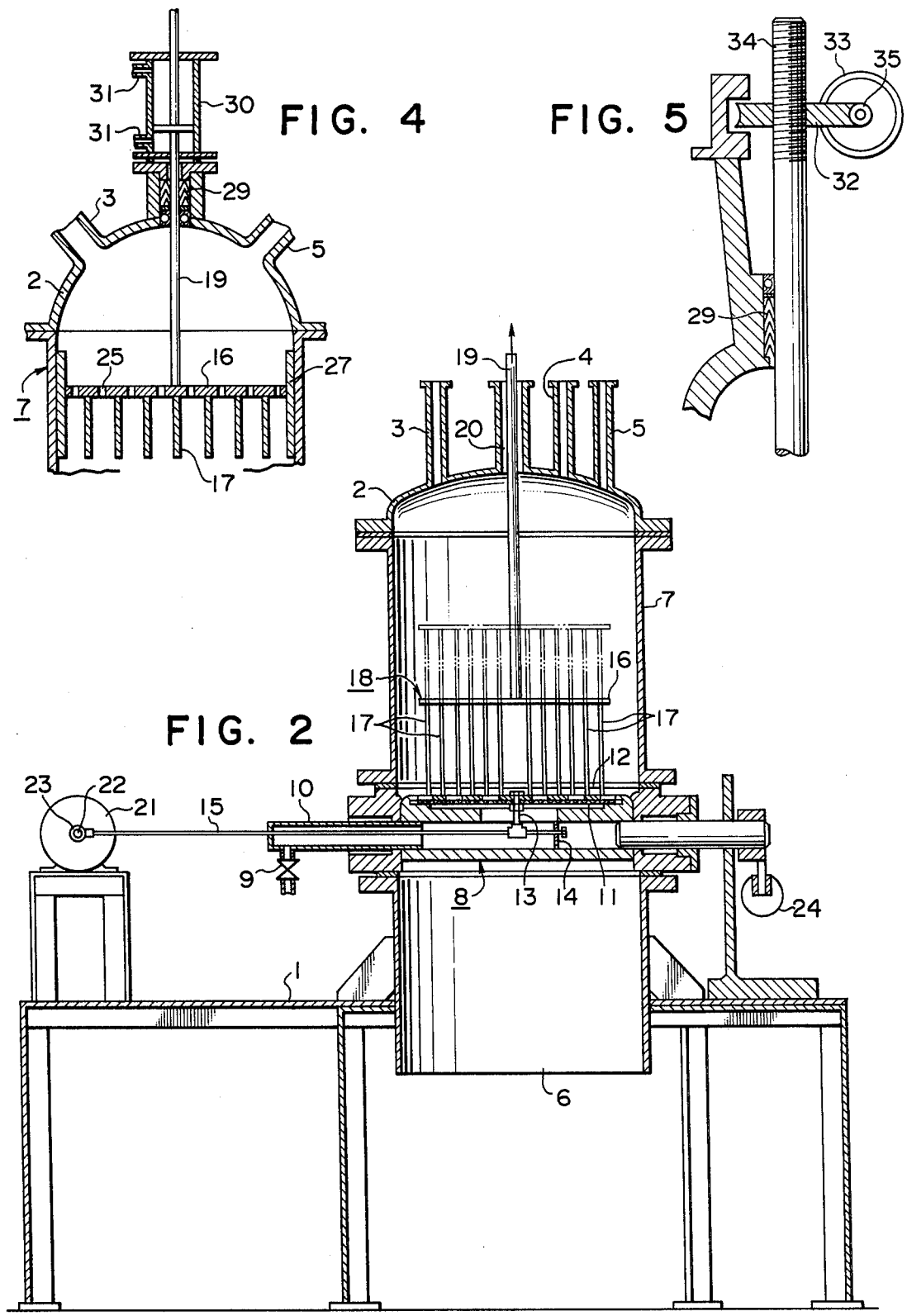

APPARATUS AND METHOD FOR FILTERING DEHYDRATING AND DRYING MATERIAL

BACKGROUND OF THE INVENTION

The present invention relates to an apparatus for filtering, dehydrating and drying particularly suspension material, powder material and the like, and to a method for filtering, dehydrating and drying same.

Conventional operations for filtering, dehydrating and drying suspension material, powder material and the like require several processes and apparatus, and the apparatus used in the conventional operations are very complicated in construction; thus, it costs much and takes much time to treat the material, and good working efficiency can hardly be obtained. Furthermore, when the treated material is carried from one process to another process, manual operations are required; thus, operators expose themselves to danger when treating hazardous material.

SUMMARY OF THE INVENTION

In accordance with the present invention, an apparatus and a method for filtering, dehydrating and drying suspension material, powder material and the like are provided. The material to be treated is filtered through a filter mesh disposed on a valve plate arranged rotatably in a vertical type filter cylinder of the apparatus to collect a filter cake on the filter mesh. Then the filter cake is dried and dropped from the filter mesh through an opening at the lower portion of the cylinder by tilting the valve plate together with the filter mesh. The apparatus may have an auxiliary filter means engagable with the filter mesh, and this means is constructed of a mounting plate and a plurality of rods of predetermined length suspended from the bottom of the mounting plate. The auxiliary filter means serves to provide advantages of increasing filtering area and of improving filtering efficiency. When the auxiliary filter means is moved upwardly from the filter mesh in course of making deposition of the filter material on the filter mesh by means of an actuator to withdraw the rods from the deposition layer, a lot of holes are formed in the deposition layer, thus filtering area is increased. Furthermore, filtering efficiency is improved in such a way that particles of material deposited on the upper surface flow into the holes to allow the deposition layer of the material to get thinner. Furthermore, a system for providing the filter mesh with vibration in the vertical and/or horizontal direction may be additionally applied to the apparatus according to the present invention.

Accordingly, an object of the present invention is to provide an apparatus for filtering, dehydrating and drying efficiently suspension material, powder material and the like.

Another object of the present invention is to provide an apparatus for filtering, dehydrating and drying suspension material, power material and the like automatically and mechanically in one process.

Another object of the present invention is to provide an apparatus for filtering, dehydrating and drying suspension material, powder material and the like which has a very simple construction.

Another object of the present invention is to provide an apparatus for filtering, dehydrating and drying suspension material, powder material and the like safely without requiring manual operations.

A further object of the present invention is to provide a method for filtering, dehydrating and drying efficiently suspension material, powder material and the like.

A further object of the present invention is to provide a method for filtering, dehydrating and drying suspension material, powder material automatically and mechanically in one process.

Still a further object of the present invention is to provide a method for filtering, dehydrating and drying suspension material, powder material safely without requiring manual operation.

Other objects and advantages of the present invention will become apparent from the following description.

BRIEF DESCRIPTION OF THE DRAWINGS

For a fuller understanding of the present invention, reference is had to the following description taken in connection with the accompanying drawings, in which:

FIG. 2 is a vertically sectional view of an apparatus according to another embodiment of the present invention;

FIG. 4 is a partial sectional view showing particularly an actuator for the auxiliary filtering means; and FIG. 5 is a partial sectional view of another actuator similar to that of FIG. 4.

DESCRIPTION OF THE PREFERRED EMBODIMENT

An apparatus of filtering, dehydrating and drying material according to one embodiment of the present invention, as shown in FIG. 1, is constructed of a vertically extending filter cylinder A having a full opening at the lower side thereof, a filtering zone B located around the center of the filter cylinder A, a hollow valve plate D bearing the filtering zone B thereon and disposed rotatably within the filter cylinder A so that material to be treated is deposited on the valve plate D when it is in the horizontal position and treated material is dumped from the valve plate B when it is rotated from the horizontal position to the vertical position, and a hollow valve stem C which is communicated with the filter zone B.

Figure 1A:
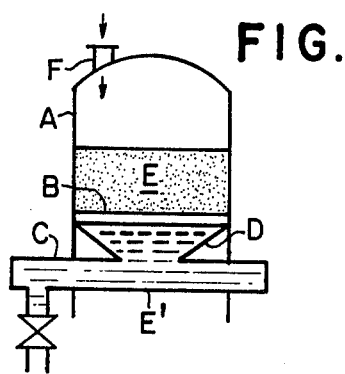
FIGS. 1A to 1F are schematical illustrations of working steps of an apparatus for filtering, dehydrating and drying material according to one embodiment of the present invention.
Figure 1B:
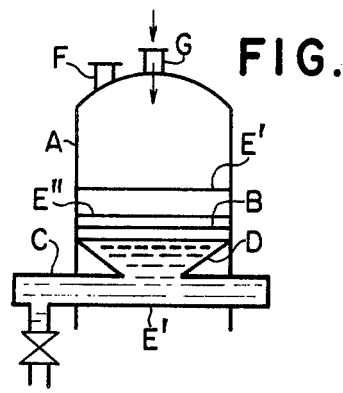
Figure 1C:
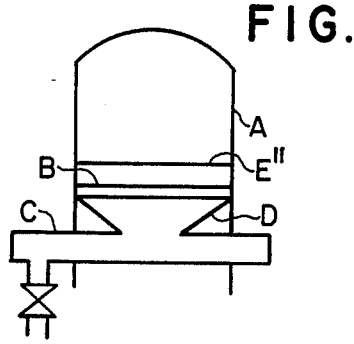
Figure 1D:
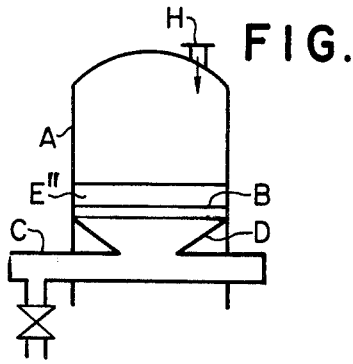
Figure 1E:
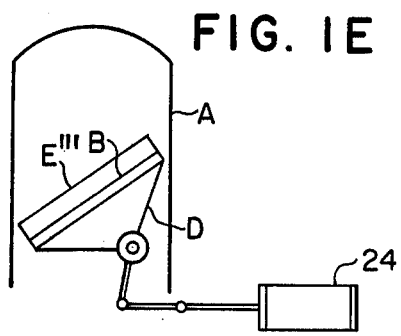
Figure 1F:
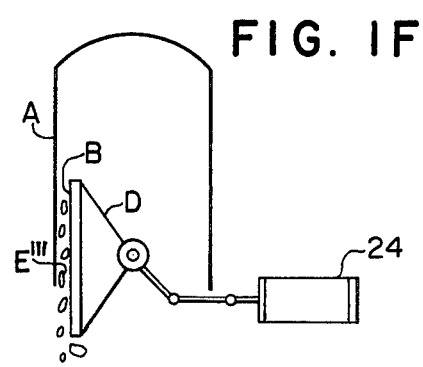

Material to be treated E such as liquid of suspension is fed through an inlet pipe F into the filter cylinder A of which the center portion is closed by the valve plate (see FIG. 1A). Then the material E is filtered through the filtering zone B on the valve plate D under pressurized air supplied through an air inlet pipe G and the filtered liquid E' is removed through the hollow valve stem C (see FIG. 1B) and dehydrated material E" is collected on the filtering zone (see FIG. 1C). Then hot air supplied through an inlet pipe H is blown upon the material E" to dry the material (E'''), so that a dried filter cake E''' is obtained (see FIG. 1D). Thereafter the valve plate D is tilted by rotating the hollow valve stem C (see FIG. E) so as to allow the filter cake E''' on the filtering zone B of the valve plate D to be dumped down the filter cylinder A (see FIG. 1F). Thus the filtered cake E''' is taken out of the filter apparatus efficiently in one process.

The filter apparatus may be provided with a vibration means to prevent the filter cake E‴ from being adhered to the filtering zone B and the screen mesh from getting clogged. Vibration is applied to the apparatus in course of filtering the liquid of suspension E in such a way as to vibrate laterally and/or vertically the filtering zone B of the valve plate D to prevent the filtering zone B from getting clogged. However, in this apparatus, as deposition layer of the material E″ becomes thicker or gets more dense, filtering efficiency on the filtering zone B is also gradually reduced. To eliminate such drawbacks, an auxiliary filter means may be provided with the filter apparatus, as shown in FIGS. 2 to 5.

Referring to FIG. 2, on a mounting base 1 is mounted a vertically extending filter cylinder 7 which has a top cover 2 arranged thereon and has a full opening 6 on the bottom portion thereof, said top cover 2 being provided with an inlet pipe 3 for feeding liquid of suspension. An inlet pipe 4 for pressurized air and an inlet pipe 5 for hot air may be provided. On the center portion of the filter cylinder 7 is horizontally arranged a hollow valve plate 8, of which filter side is connected to a hollow valve stem 10 with a discharge valve 9, said valve plate 8 being rotated around the hollow valve stem 10 between the horizontal and vertical positions thereof within the filter cylinder 7 by means of an actuator 24 such as an air cylinder, so that material to be treated is deposited on the valve plate 8 when it is in the horizontal position, and treated material is dumped from the valve plate 8 when it is rotated from the horizontal position to the vertical position. The rotating angle of the valve plate 8 is preferably about 90 degrees. On the filter side of the valve plate 8 is arranged laterally and/or vertically movably a filter mesh 12 integral with a perforation plate 11 therebelow, from which a connection rod 13 is suspended to be engaged with a vibration rod 15 which extends through the hollow valve stem 10 and is supported at its free end within a support ring 14 set fast to the valve stem 10. In the upper portion of the filter cylinder 7 is housed an auxiliary filter means 18 comprising a mounting plate 16 of which diameter is smaller than of the inner wall of the filter cylinder 7, and a large number of suspension rods 17 of predetermined length set fast to the mounting plate 16 so that the rods 17 is suspended from the plate 16. At the center of the mounting plate 16 of the auxiliary filter means 18 is securely provided an actuator of a rod, a cord or the like 19 which extends upward through a hole 20 on the top cover 2.

As shown in FIG. 2, the vibrating rod 15 comprises a long reciprocal rod connected to a crank piece 23 on an output end 22 of electric motor 21.

Figure 3:
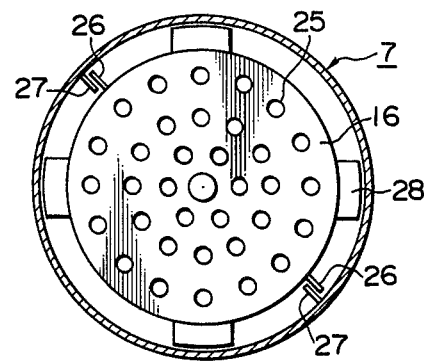
FIG. 3 is a plan view of an auxiliary filtering means for the apparatus as shown in FIG. 2.

FIG. 3 is a plan view of the auxiliary filter means 18, wherein reference numeral 16 denotes a circular mounting plate, numeral 25 does a large number of perforated holes for liquid passage, the numerals 26 and 27 do stopper means for prevention of rotation, and numeral 28 does slide piece of plastics material e.g. Tephlon protruded from the side portion of the mounting plate 16.

FIG. 4 illustrates by way of a partial cross sectional view an example of actuator for lifting and lowering the auxiliary filter means 18, that is, pneumatic cylinder means, wherein numeral 30 denotes an air cylinder, numeral 29 does a grand packing arranged between the air cylinder 30 and the upper portion of the filter cylinder 7, and numeral 31 does an air inlet or outlet.

FIG. 5 is another example of actuator for the auxiliary filter means by which said pneumatic cylinder arrangement is replaced, wherein a connection of worm and worm wheel is employed in stead of pneumatic piston and cylinder means. In FIG. 5, numeral 32 denotes a worm wheel having an inner thread at a center thereof, numeral 33 a hand wheel for rotating a worm shaft 35, and numeral 34 does a threaded portion of the actuator rod 19, which is allowed to move up and down by means of rotation of the worm wheel 32.

The filter apparatus as constructed according to the present invention as described above is operated in the following manner.

At first the valve plate 8 is rotated to shut down the center portion of the filter cylinder 7 and a plurality of suspension rods 17 of the auxiliary filter means 18 are lowered to abut against the upper surface of the valve plate 8 and then liquid of suspension to be filtered is fed through the inlet pipe 3 into the interior of the filter cylinder 7. Then pressurized air is blown through the air inlet pipe 4 thereinto, as desired, so that the liquid is allowed to be put in forcible filtration through the filter mesh 12 on the valve plate 8. Then the filtered liquid is removed from the mesh plate 12 through the valve plate 8 by opening the discharge valve 9 of the hollow valve stem 10, while the residual solid material is left deposited on the mesh plate 12. In course of making deposition of the solid material on the mesh plate 12, the auxiliary filter means 18 supported on the mesh plate 12 at its lower end is moved up toward the hole 20 by means of the actuator rod 19, resulting in a lot of residuary recesses corresponding to the suspension rods 17 of the auxiliary filter means 18. A group of said residuary recesses or holes serves to increase effective filtering area for liquid of suspension and to improve filtering efficiency in such a manner that fine grain of material on the upper portion of the deposition flows into said residuary recesses thus making additional deposition of the material on the side and bottom thereof to cause the deposition layer of fine grain of material to get thinner. The filtered material is then dried either by hot air supplied through the air inlet pipe 5 or in a natural way, so that filter cake is produced in a shorter period of time.

In case of certain kind of suspension material the above mentioned steps of filtration may be accomplished just by the weight of material itself to be filtered without pressurized air. Thus the air inlet pipe 4 is eliminated. Further in case drying by hot air isn't required, the hot air inlet pipe 5 is also eliminated.

When the vibrating rod 15 supported at one end thereof with the support ring 14 is vibratorily actuated through the crank piece of the output shaft 23 by the motor 21 during filtering and dehydrating the filter mesh 12 is vibrated together with the perforation plate 11, because the former is connected to the latter through the connecting rod 13 fastened to the lower side of the latter. This contributes to preventing the filter mesh from getting clogged with solid material and to allowing the filter cake to be floated up.

Accordingly, the filter cake on the filter mesh 12 is completely dumped through the opening 6 of the filter cylinder 7 by tilting the valve plate 8 with the hollow valve stem 10 as vibrating is applied. Moreover such removal of filter cake is carried out smoothly and in shorter time by way of dumping activity under vibration.

As mentioned above, the present invention improves remarkably filtering efficiency by means of a group of recesses or holes, corresponding to the suspension rods 17, which are brought about on the deposition layer after removing upward the auxiliary filter means 18 which is located on the filter mesh 12. So the apparatus according to the present invention provides excellent performance of filtering, dehydrating and drying.

What is claimed is:

1. A method for filtering, dehydrating and drying material comprising steps of supplying said material to be treated into a filter cylinder of a filter apparatus through a supply pipe provided at the upper portion of said filter cylinder;

filtering said material with a filter means provided in said filter cylinder to collect filter material on said filter means and to remove a filtrate through a rotatable hollow valve stem communicating with said filter means and extending laterally from said filter cylinder;

drying said filter material on said filter means to prepare dried filter material; and vibrating said dried filter material on said filter means with a vibration means connected thereto and dropping said dried filter material from said filter means through an opening provided at the lower portion of said filter cylinder by rotating said filter means;

wherein said filter cylinder has a hollow valve plate mounted rotatably at the center portion thereof by means of said hollow valve stem connected thereto so that material to be treated is deposited on said valve plate when it is in the horizontal position and treated material is dumped from said valve plate when it is rotated from the horizontal position to the vertical position, and said filter means is provided on said hollow valve plate and communicates with said hollow valve stem through said valve plate.

2. A method as defined in claim 1 wherein said material is filtered by means of compressed air supplied into said filter cylinder.

3. A method as defined in claim 1 wherein said material is filtered by gravity.

4. A method as defined in claim 1 wherein said material is dried by means of hot air supplied into said filter cylinder.

5. A method for filtering, dehydrating and drying material comprising steps of supplying said material to be treated into a filter cylinder of a filter apparatus through a supply pipe provided at the upper portion of said filter cylinder;

filtering said material with a filter means in said filter cylinder to collect filter material on said filter means and to remove a filtrate through a rotatable hollow valve stem communicating with said filter means and extending laterally from said filter cylinder, said material being filtered under operation of an auxiliary filter means movable in said filter cylinder so that filtering is accomplished efficiently;

drying said filter material on said filter means to prepare dried filter material; and vibrating said dried filter material on said filter means with a vibration means connected thereto and dropping said dried filter material from said filter means through an opening at the lower end of said filter cylinder by rotating said filter means;

wherein said filter cylinder has a hollow valve plate mounted rotatably at the center portion thereof by means of said rotatable hollow valve stem connected thereto so that material to be treated is deposited on said valve plate when it is in the horizontal position and treated material is dumped from said valve plate when it is rotated from the horizontal position to the vertical position, said filter means is provided on said hollow valve plate and communicates with said hollow valve stem through said hollow valve plate, and said auxiliary filter means comprises a mounting plate, a plurality of rods suspended from said mounting plate and an actuator extending upwardly from said mounting plate through a hole provided at the top of said filter cylinder, so that said auxiliary filter means may be moved upwardly and downwardly in said filter cylinder to allow said rods to be engagable with said filter means of said valve plate.

6. A method as defined in claim 5 wherein said material is filtered by means of compressed air supplied into said filter cylinder.

7. A method as defined in claim 5 wherein said material is filtered by gravity.

8. A method as defined in claim 5 wherein said material is dried by means of hot air supplied into said filter cylinder.

9. A method as defined in claim 5 wherein said actuator is moved upwardly and downwardly by means of pneumatic cylinder means.

10. A method as defined in claim 5 wherein said actuator is moved upwardly and downwardly by means of a worm and worm wheel assembly.

11. An apparatus for filtering, dehydrating and drying a material, comprising:

a vertically extending filter cylinder formed with a top cover formed with input means for supplying a material to be filtered, said cylinder having a full opening on the lower side thereof;

a base for mounting said cylinder;

a hollow valve plate positioned in said cylinder;

filter means for filtering the material to be filtered supported on said hollow valve plate;

auxiliary filter means positioned in said cylinder above said filter means, said auxiliary filter means comprising a mounting plate adapted to permit the passage of material to be filtered therepast and formed with a plurality of rods suspended from the lower surface thereof and an actuator extending upwardly from the upper surface thereof through an opening provided in the top cover of said cylinder, whereby said auxiliary filter means may be moved upwardly and downwardly by moving said actuator to permit the lower end of said rods to engage with said filter means; and means for rotating said hollow valve plate and filter means between a first position which is substantially horizontal with respect to the acis of said cylinder for receiving the material to be filtered, and a second position which is substantially vertical with respect to the axis of said cylinder for dumping the filtered material from said valve plate, said rotating means including hollow valve stem means defining the axis of rotation of said hollow valve plate and for communicating between said filter means and an outlet for discharging the liquid from the filtered material.

12. An apparatus as defined in claim 11 wherein said filter cylinder has an inlet for compressed air and an inlet for hot air connected thereto at the upper portion thereof.

13. An apparatus as defined in claim 11 wherein said filter means comprises a filter mesh of cloth.

14. An apparatus as defined in claim 11 wherein said filter means comprises a filter mesh of metallic screen.

15. An apparatus as defined in claim 11 wherein said filter means has a perforation plate attached thereto integrally.

16. An apparatus as defined in claim 11 wherein said mounting plate is provided with holes for passing said material therethrough.

17. An apparatus as defined in claim 11 wherein said actuator is a rod.

18. An apparatus as defined in claim 11 wherein said actuator is a cord.

19. An apparatus as defined in claim 11 wherein said actuator is moved upwardly and downwardly by means of pneumatic cylinder means.

20. An apparatus as defined in claim 11 wherein said actuator is moved upwardly and downwardly by means of a worm and worm wheel assembly.

21. The apparatus of claim 11, including vibrating means for vibrating said filter means in at least one of the horizontal and vertical direction relative to the axis of said cylinder.

22. The apparatus of claim 21, including a vibration actuator external to said cylinder and including a connecting rod means coupled to said filter means and extending through said hollow valve stem means for cooperation between said vibration actuator means and said filter means.

23. The apparatus of claim 11, including vibrating means for vibrating said filter means in at least one of the horizontal and vertical directions relative to the axis of said cylinder.

24. The apparatus of claim 11, wherein said mounting plate is of a smaller diameter than the inner wall of said cylinder.

25. A method for filtering, dehydrating and drying a material comprising steps of
supplying the material to be treated into a filter cylinder of a filter apparatus through a supply pipe provided at the upper portion of said filter cylinder;
filtering the material with a filter means in said filter cylinder to collect filtered material on said filter means and to remove a filtrate through a hollow valve stem communicating with said filter means and extending laterally through said filter cylinder,
obstructing by auxiliary filter means a portion of the surface of said filter means during a first portion of said filtering to form openings in the filtered material deposited on said filter means;
displacing said auxiliary filter means from said filter means during a second portion of said filtering to expose said openings on said filtered material to said material to be filtered;
drying the filtered material on said filter means to prepare dried filter material; and
rotating about an axis defined by said hollow valve stem, a hollow valve plate which supports said filter means so that said filter means communicates with said hollow valve stem through said hollow valve plate, said hollow valve plate rotating between a horizontal position at which the material to be treated is deposited on said valve plate and a vertical position at which the treated material is dumped from said valve plate.

26. The method of claim 25, wherein the openings formed in said filtered material of said auxiliary filter means are a plurality of spaced openings distributed over the surface of the filter means.

27. The method of claim 25, including adding compressed air into said filter cylinder.

28. The method of claim 25, wherein said filtering is by gravity.

29. The method of claim 25, wherein said drying step includes supplying hot air into said filter cylinder.

* * * * *